United States Patent
Corda et al.

(10) Patent No.: US 9,160,813 B2
(45) Date of Patent: Oct. 13, 2015

(54) METHOD AND APPARATUS FOR TRANSMITTING AN NFC APPLICATION VIA A SECURE CHANNEL INCLUDING A PROXY AND COMPUTING DEVICE

(75) Inventors: Alexandre Corda, Nice (FR); Baptiste Affouard, Golfe Juan (FR)

(73) Assignee: NXP, B.V., Eindhoven (NL)

( * ) Notice: Subject to any disclaimer, the term of this patent is extended or adjusted under 35 U.S.C. 154(b) by 744 days.

(21) Appl. No.: 13/255,464

(22) PCT Filed: Feb. 24, 2010

(86) PCT No.: PCT/IB2010/050807
§ 371 (c)(1),
(2), (4) Date: Sep. 8, 2011

(87) PCT Pub. No.: WO2010/103414
PCT Pub. Date: Sep. 16, 2010

(65) Prior Publication Data
US 2012/0009873 A1    Jan. 12, 2012

(30) Foreign Application Priority Data

Mar. 10, 2009 (EP) ..................... 09154742

(51) Int. Cl.
*H04B 5/00* (2006.01)
*H04L 29/08* (2006.01)
*G06F 21/35* (2013.01)
*H04L 29/06* (2006.01)

(52) U.S. Cl.
CPC ............... *H04L 67/34* (2013.01); *G06F 21/35* (2013.01); *H04L 63/0492* (2013.01); *H04L 63/20* (2013.01); *H04L 67/12* (2013.01); *G06F 2221/2115* (2013.01)

(58) Field of Classification Search
None
See application file for complete search history.

(56) References Cited

U.S. PATENT DOCUMENTS

| | | | |
|---|---|---|---|
| 2007/0001008 A1* | 1/2007 | Steffen .......................... | 235/451 |
| 2007/0190939 A1 | 8/2007 | Abel | |
| 2007/0263595 A1* | 11/2007 | Charrat .......................... | 370/351 |
| 2008/0238610 A1* | 10/2008 | Rosenberg ..................... | 340/5.7 |
| 2008/0276301 A1 | 11/2008 | Nataraj et al. | |
| 2010/0043016 A1 | 2/2010 | Anzai | |
| 2011/0029777 A1* | 2/2011 | Murakami et al. ............ | 713/171 |

FOREIGN PATENT DOCUMENTS

| | | |
|---|---|---|
| WO | 02/091316 A1 | 11/2002 |
| WO | 03/012717 A1 | 2/2003 |
| WO | 2005/119606 A1 | 12/2005 |

(Continued)

OTHER PUBLICATIONS

International Search Report for Int'l Patent Appln. No. PCT/IB2010/050887 (Jul. 19, 2010).
GSMA; "Mobile NFC Technical Guidelines Version 2.0"; 264 pages (Nov. 2007).

(Continued)

*Primary Examiner* — Alejandro Rivero

(57) ABSTRACT

In a method for transmitting an NFC application, a secure channel is established by way of a proxy between a Trusted Service Manager and an NFC device via a computing device (10) including the proxy and via an RFID reader being a part of the computing device. The NFC application received at the computing device from the Trusted Service Manager is channeled through the secure channel to the NFC device utilizing the proxy.

19 Claims, 3 Drawing Sheets

(56) References Cited

FOREIGN PATENT DOCUMENTS

| WO | 2008/050439 A1 | 5/2008 |
| WO | 2009/013700 A2 | 1/2009 |

OTHER PUBLICATIONS

Rankl, Wolfgang et al; "Handbuch Der Chipkarten"; Hanser, Netherlands; pp. 527-532 (2008).

Communication of a notice of opposition for counterpart application 10708607.6; 14 pages (Jan. 13, 2015).

* cited by examiner

METHOD AND APPARATUS FOR TRANSMITTING AN NFC APPLICATION VIA A SECURE CHANNEL INCLUDING A PROXY AND COMPUTING DEVICE

FIELD OF THE INVENTION

The invention relates to a method for transmitting an NFC application and to a computer device.

BACKGROUND OF THE INVENTION

Near Field Communication, abbreviated "NFC", is a short-range high frequency wireless communication technology enabling exchange of data between devices within a relative short distance, for instance, about 10 centimeters. NFC is based on RFID (radio frequency identification) and combines an interface of a smartcard and a reader into a single device. NFC devices can communicate with RFID readers and with other NFC devices and may, for instance, be mobile phones.

Business opportunities presented by using NFC enabled mobile devices, such as mobile phones, for, for instance, contactless payment, transport ticketing, loyalty and other services may be of interest, for instance, for mobile operators and service providers in the banking, transport and retail sectors.

For addressing operational requirements, NFC utilizes a so called Trusted Service Manger (TSM) which is supposed to help service providers to securely distribute and manage, for instance, contactless services for their customers utilizing networks of mobile operators. FIG. 1 illustrates how a Trusted Service Manager Backend 1 is conventionally used to transmit an NFC application 9 issued by a service provider web site 2 to a mobile telephone 3 comprising NFC capability.

If the service provider wants to issue the NFC application 9 to the mobile phone 3, he connects his service provider web site 2 to the mobile phone 3 through the Trusted Service Manager Backend 1. The Trusted Service Manager Backend 1 establishes a secure channel to transmit the NFC application 9 over the air OTA to the mobile phone 3 which includes an appropriate interface which is, for instance, a GSM interface not explicitly shown in the figures.

The mobile phone 3 comprises a proxy 4, a secure application 5, also known as "wallet", to present information about NFC applications already installed on the mobile phone 3 to the user of the mobile phone 3, an NFC module including a Service Manager 6 and a memory 7 to store the NFC application.

It is an object of the invention to provide an alternative method to transfer an NFC application to an NFC device.

OBJECT AND SUMMARY OF THE INVENTION

The object of the invention is achieved by means of a method for transmitting an NFC application, comprising the steps of:

establishing, by means of a proxy, a secure channel between a Trusted Service Manager and an NFC device via a computing device comprising the proxy and via an RFID reader of the computing device, and channeling, by utilizing the proxy, to the NFC device an NFC application intended for the NFC device and received at the computing device from the Trusted Service Manager through the secure channel.

The object is also achieved in accordance by the invention by means of a computing device comprising a reader and a proxy configured to carry out the inventive method for transmitting the NFC application.

The computing device may particularly be a point of sale, can, however, be any computing device, such as a PC, home computer or PDA.

According to the inventive method, the NFC application is not transmitted from the Trusted Service Manager directly to the NFC device over the air, but via means of RFID (radio frequency identification) utilizing the RFID reader and the proxy which runs on the computing device. The proxy of the computing device is an application run on the computing device and basically services a request of the Trusted Service Manager to load up the NFC application to the NFC device via the computing device instead of sending the NFC application directly over the air. Due to the proxy, the Trusted Service Manager can communicate with the NFC device in a secure manner.

The reader which may have both, reading and writing capabilities, communicates with the NFC device by means of an electromagnetic wave or signal. The NFC device may include an appropriate NFC interface based on RFID designed to accommodate the reader such that the NFC application can be received at the NFC device utilizing the NFC interface of the NFC device.

In one embodiment of the inventive method, a Service Manager of the NFC device is utilized to process the NFC application received by the NFC interface. The Service Manager is an application run on the NFC device. Thus, the Service Manager of the NFC device can communicate with the Trusted Service Manager in a secure manner utilizing the secure channel provided by the proxy.

The NFC application received at the NFC device may be stored on a memory of the NFC device. This procedure may be controlled by the Service Manager.

In order to assure the channel to be secure, the inventive method may comprise exchanging keys stored on a memory of the NFC device and associated with the NFC device and/or a user of the NFC device between the NFC device and the Trusted Service Manager utilizing the proxy and the reader. The exchange of the keys may be controlled by the Service Manager and/or the Trusted Service Manager.

Before establishing the secure channel, the NFC application intended for the NFC device may be received at the Trusted Service Manager from a service provider associated with the NFC device via Web services.

The NFC device may be a device including an interface for communicating over the air, such as a GSM interface. An example of such a device is a mobile phone.

The inventive method for transmitting the NFC application to the NFC device is not based on communication over the air (OTA). Consequently, the NFC device does not need such a communication interface and further does not need a wallet and a proxy located within the NFC device as it is needed if transmitting the NFC application within the conventional set-up. The NFC device may therefore be a device lacking such an interface (a so called non-connected NFC device), such as an NFC music player, or may be an NFC plastic card, such as a Mifare card. As a result, the application of NFC can be extended to an increased variety of devices and is not only limited to connected devices, i.e. NFC devices which can receive NFC applications over the air (OTA).

The inventive method is applicable to all kinds of actions related to issuing the NFC application to the NFC device, including reloading or revocation.

These and other aspects of the invention are apparent from and will be elucidated with reference to the embodiments described hereinafter.

BRIEF DESCRIPTION OF THE DRAWINGS

The invention will be described in greater detail hereinafter, by way of non-limiting examples, with reference to the embodiments shown in the drawings.

DESCRIPTION OF EMBODIMENTS

Figure 1:
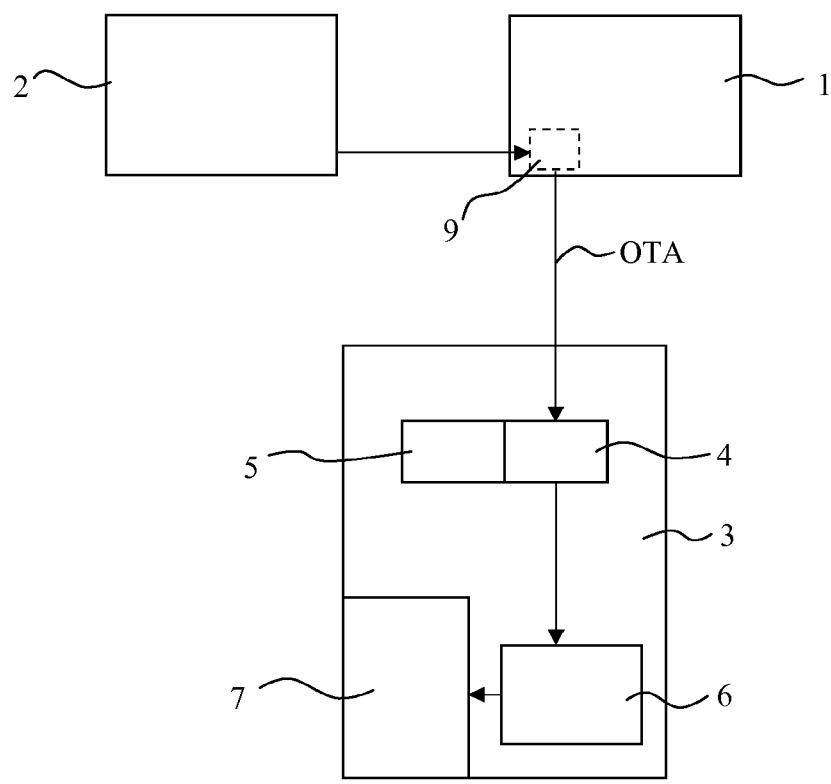
FIG. 1 is a diagram illustrating transferring an NFC application from a Trusted service provider to an NFC device in a conventional manner.

FIG. 1 has been discussed in the introduction.

Figure 2:
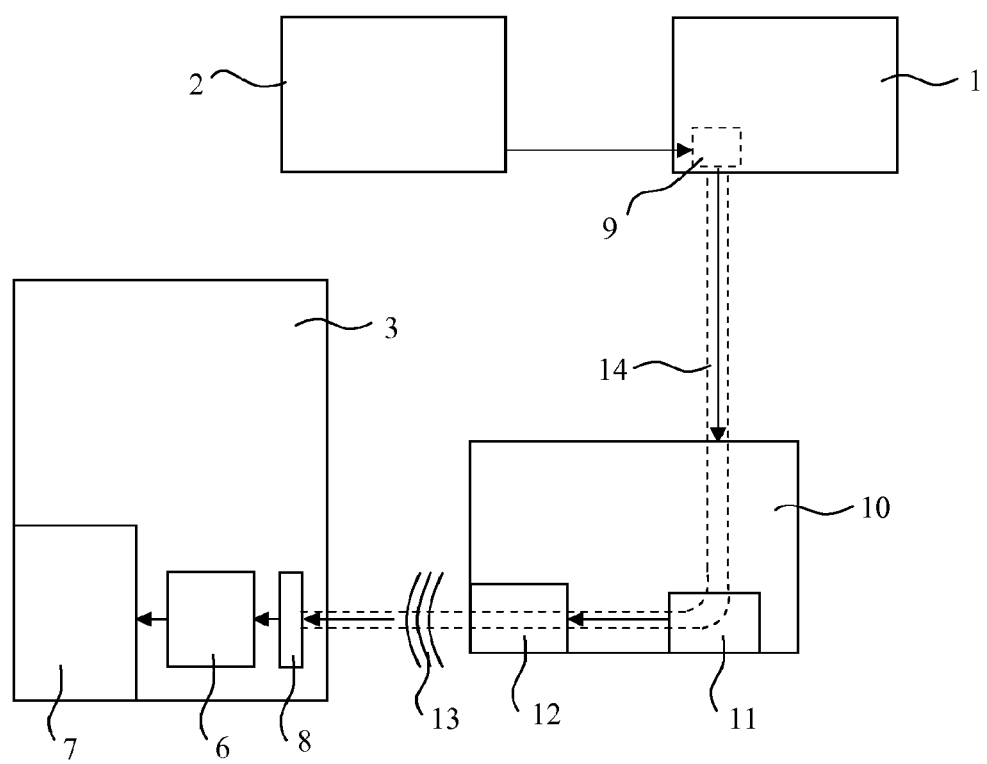
FIG. 2 is a diagram illustrating transferring an NFC application from a service provider to an NFC device.

FIG. 2 shows the mobile phone 3 of FIG. 1 as an example of a hand set which includes NFC capabilities. The mobile phone 3 is thus an example of an NFC device.

FIG. 2 further shows the Trusted Service Manger Backend 1 and the service provider web site 2 operated by the service provider.

Furthermore, the mobile phone 3 comprises a radio frequency identification (RFID) interface 8 operatively coupled to the Service Manager 6. The RFID interface 8 is configured to establish and to conduct communication between the mobile phone 3 and an RFID reader 12 via electromagnetic waves 13.

For the exemplary embodiment, the reader 12, which includes reading and writing capabilities, is part of a point of sale 10 such that the point of sale 10 can communicate with the mobile phone 3 for conducting conventional transactions based on RFID as it is generally known in the art.

For the exemplary embodiment, the point of sale 10 comprises further a proxy 11. The proxy 11 is configured to service requests of the Trusted Service Manager Backup 1 to load up the NFC application 9 to the mobile phone 3 instead of sending the NFC application 9 over the air OTA.

Depending on the service provider, the NFC application 9 may, for instance, be a transport application, a payment application, a loyalty application, an event ticket or a governmental application. The NFC application 9 is meant to be stored and executed on the mobile phone 3.

Figure 3:
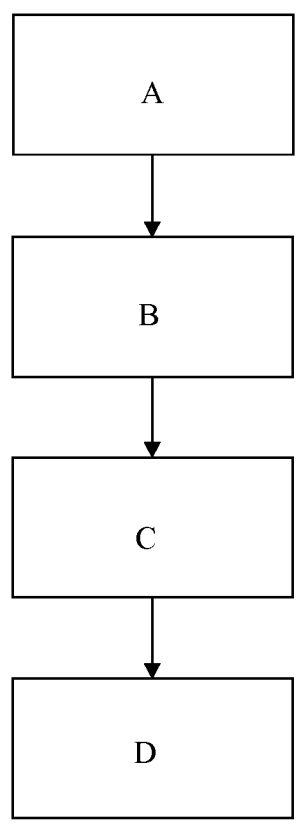
FIG. 3 is a flow chart illustrating the transfer of the NFC application of FIG. 2

FIG. 3 summarizes the steps performed for loading up the NFC application 9.

If the service provider associated with the mobile phone 3 wants to issue the NFC application 9 which is, for instance, a Mifare Application, then the service provider web site 2 connects to the Trusted Service Manager Backend 1. Thus, the service provider connects to the Trusted Service Manager Backend 1 through Web Services and sends the NFC application 9 intended for the mobile phone 3 to the Trusted Service Manager Backend 1, step A of the flow chart of FIG. 3.

When the mobile phone 3 is in proximity of the point of sale 10 such that the electromagnetic waves 13 emitted by the reader 12 can reach the RFID interface 8 of the mobile phone 3 with sufficient energy level, then the proxy 11 establishes a secure channel 14 between the Trusted Service Manger Backend 1 and the mobile phone 3, step B of the flow chart. Particularly, the proxy 11 of the Point of Sale 10 establishes the secure channel 14 via the reader 12 and the RFID interface 8 of the mobile phone 3 to the Service Manager 6 of the mobile phone 3.

In order to establish and to potentially assure the channel 14 to be fully secure, keys stored on the mobile phone 3, for instance, on the memory 7 and particularly managed by the Service Manager 6 may be exchanged between the mobile phone 3 and the Trusted Service Manger Backend 1 via the proxy 11, the RFID reader 12 and the RFID interface 8 of the mobile phone 3.

After having established the secure channel 14 between the Trusted Service Manger Backend 1 and the mobile phone 3 via the proxy 11, the Trusted Service Manger Backend 1 and the mobile phone 3, particularly the Service Manager 6 of the mobile phone 3 can communicate in a secure manner. Then, the Trusted Service Manger Backend 1 transmits the NFC application 9 to the point of sale 10 which forwards it to the mobile phone utilizing the proxy 11 and the reader 12, step C of the flow chart.

For the exemplary embodiment, the Service Manager 6 stores the received NFC application 9 on the memory 7 and initializes the newly loaded NFC application 9 so that it is available on the mobile phone 3, step D of the flow chart.

For the exemplary embodiment described, the proxy 11 is part of the point of sale 10. Generally, the proxy 11 does not need to be part of a point of sale. In General, the proxy 11 can be part of a computing device, such as a PC or a PDA, which are connected to or comprise a RFID reader 12 such that the Trusted Service Manager Backend 1 can establish the secure channel 14 via the proxy 11 and the reader 12 to the mobile phone 3 for sending the NFC application 9.

Finally, it should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

The invention claimed is:

1. A method for transmitting an NFC application, comprising:

establishing, by utilizing a proxy, a secure channel between a Trusted Service Manager and an NFC device via a computing device comprising the proxy and via an RFID reader of the computing device, the RFID reader having reading and writing capabilities, and including using at least one key between the NFC device and the computing device via the proxy, the RFID reader of the computing device, and an RFID interface of the NFC device to establish the secure channel, channeling, by utilizing the proxy, to the NFC device an NFC application intended for the NFC device and received at the computing device from the Trusted Service Manager through the secure channel, and receiving the NFC application at the NFC device utilizing an NFC interface of the NFC device.

2. The method of claim 1, comprising processing the NFC application received by the NFC interface utilizing a Service Manager of the NFC device and/or storing the NFC application on a memory of the NFC device.

3. The method of claim 1, comprising exchanging keys stored on a memory of the NFC device and associated with the NFC device and/or a user of the NFC device between the NFC device and the Trusted Service Manager utilizing the proxy and the reader for establishing the secure channel.

4. The method of claim 1, comprising, before establishing the secure channel, receiving at the Trusted Service Manager the NFC application intended for the NFC device from a service provider associated with the NFC device via Web services.

5. The method of claim 1, wherein the computing device is a point of sale, a home computer, or a PDA.

6. The method of claim 1, wherein the NFC device is a mobile phone, a plastic card, or a non-connected NFC device.

7. The method of claim 1, wherein the NFC application comprises loading the NFC application on the NFC device.

8. The method of claim 1, further including the steps of storing the NFC application on a memory of the NFC device in response to channeling, by utilizing the proxy, the NFC application to the NFC device, executing the NFC application on the NFC device, and revoking the NFC application.

9. The method of claim 1, wherein the step of establishing the secure channel includes exchanging electromagnetic signals between the RFID reader of the computing device and the RFID interface of the NFC device, with a sufficient energy level and in response to the NFC device being proximate to the computing device.

10. The method of claim 1, wherein the step of channeling the NFC application includes channeling at least one of a transport application, a payment application, a loyalty application, an event ticket, and a governmental application.

11. The method of claim 1, further including the steps of storing the NFC application on a memory of the NFC device in response to channeling, by utilizing the proxy, the NFC application to the NFC device, and executing the NFC application on the NFC device.

12. A computing device comprising a reader and a proxy configured to carry out the method of claim 1.

13. The computing device of claim 12, being a point of sale, a PC, or a PDA.

14. An apparatus comprising:
a computing device, including an RFID reader having reading and writing capabilities and a proxy, configured and arranged to receive an NFC application from a Trusted Service Manager; and
an NFC device, including an RFID interface and an NFC interface, wherein the NFC device and the computing device are configured and arranged to
establish a secure channel, by way of the proxy, with the Trusted Service Manager via the RFID reader of the computing device, and including using at least one key between the NFC device and the computing device via the proxy, the RFID reader of the computing device, and the RFID interface of the NFC device to establish the secure channel,
channel, by utilizing the proxy, an NFC application intended for the NFC device, and
receive the NFC application utilizing the NFC interface.

15. The apparatus of claim 14, wherein the NFC device and the computing device are further configured and arranged to store the NFC application on a memory of the NFC device in response to channeling, by utilizing the proxy, the NFC application to the NFC device, and to execute the NFC application on the NFC device.

16. The apparatus of claim 14, wherein the NFC device and the computing device are further configured and arranged to establish the secure channel via exchanging electromagnetic signals between the RFID reader of the computing device and the RFID interface of the NFC device, with a sufficient energy level and in response to the NFC device being proximate to the computing device.

17. The apparatus of claim 14, wherein the NFC application includes at least one of a transport application, a payment application, a loyalty application, an event ticket, and a governmental application; and the NFC device and the computing device are further configured and arranged to store the NFC application on a memory of the NFC device in response to channeling, by utilizing the proxy, the NFC application to the NFC device, and to execute the NFC application on the NFC device.

18. A method for transmitting an NFC application, comprising:
establishing, by utilizing a proxy, a secure channel between a Trusted Service Manager and an NFC device via a computing device comprising the proxy and via an RFID reader of the computing device, the RFID reader having reading and writing capabilities, and
channeling, by utilizing the proxy, to the NFC device an NFC application intended for the NFC device and received at the computing device from the Trusted Service Manager through the secure channel, receiving the NFC application at the NFC device utilizing an NFC interface of the NFC device,
wherein the step of establishing the secure channel includes
communicating electromagnetic signals between the RFID reader of the computing device and an RFID interface of the NFC device, with a sufficient energy level and in response to the NFC device being proximate to the computing device, and
using at least one key between the NFC device and the computing device via the proxy, the RFID reader of the computing device, and the RFID interface of the NFC device to establish the secure channel.

19. An apparatus comprising:
a computing device, including an RFID reader having reading and writing capabilities and a proxy, configured and arranged to receive an NFC application from a Trusted Service Manager; and
an NFC device, including an RFID interface and an NFC interface, wherein the NFC device and the computing device are configured and arranged to
establish a secure channel, by way of the proxy, with the Trusted Service Manager via the RFID reader of the computing device,
channel, by utilizing the proxy, an NFC application intended for the NFC device, and
receive the NFC application utilizing the NFC interface, wherein the NFC device and the computing device are further configured and arranged to exchange electromagnetic signals between the RFID reader of the computing device and the RFID interface of the NFC device, with a sufficient energy level and in response to the NFC device being proximate to the computing device, and using at least one key between the NFC device and the computing device via the proxy, the RFID reader of the computing device, and the RFID interface to establish the secure channel.

* * * * *